US011220253B2

United States Patent
Ford et al.

(10) Patent No.: US 11,220,253 B2
(45) Date of Patent: Jan. 11, 2022

(54) METHODS AND SYSTEM FOR REACTIVATING ENGINE CYLINDERS

(71) Applicant: Ford Global Technologies, LLC, Dearborn, MI (US)

(72) Inventors: Stuart Ford, Farmington Hills, MI (US); Amey Karnik, Canton, MI (US); Jeffrey Doering, Canton, MI (US); Adam Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 16/248,591

(22) Filed: Jan. 15, 2019

(65) Prior Publication Data

US 2020/0223425 A1   Jul. 16, 2020

(51) Int. Cl.
| | |
|---|---|
| *B60W 20/15* | (2016.01) |
| *F02D 13/02* | (2006.01) |
| *F02D 17/02* | (2006.01) |
| *B60W 10/06* | (2006.01) |
| *B60W 10/08* | (2006.01) |

(52) U.S. Cl.
CPC ............ *B60W 20/15* (2016.01); *B60W 10/06* (2013.01); *B60W 10/08* (2013.01); *F02D 13/0203* (2013.01); *F02D 17/02* (2013.01); *B60W 2540/10* (2013.01); *B60W 2710/0605* (2013.01); *B60W 2710/083* (2013.01); *F02D 2200/0406* (2013.01); *F02D 2200/503* (2013.01); *F02D 2250/18* (2013.01)

(58) Field of Classification Search
CPC ...... B60W 20/15; B60W 10/06; B60W 10/08; F02D 13/0203; F02D 17/02
See application file for complete search history.

(56) References Cited

U.S. PATENT DOCUMENTS

| | | | |
|---|---|---|---|
| 6,986,399 | B2 | 1/2006 | Bhavsar et al. |
| 8,464,690 | B2 | 6/2013 | Yuille et al. |
| 8,892,330 | B2 | 11/2014 | Yuille et al. |
| 9,267,454 | B2 | 2/2016 | Wilcutts et al. |
| 9,422,880 | B2 | 8/2016 | Phillips et al. |
| 9,926,868 | B2 | 3/2018 | Serrano et al. |
| 2007/0032340 | A1* | 2/2007 | Hrovat .................. F16H 63/502 477/107 |
| 2009/0227420 | A1* | 9/2009 | Jess ........................ F02D 17/02 477/101 |

OTHER PUBLICATIONS

Wilcutts, M. et al., "Electrified Dynamic Skip Fire (eDSF): Design and Benefits," SAE Technical Paper 2018-01-0864, Apr. 3, 2018, 8 pages.

* cited by examiner

*Primary Examiner* — Rami Khatib
*Assistant Examiner* — Shahira Baajour
(74) *Attorney, Agent, or Firm* — David Kelley; McCoy Russell LLP

(57) ABSTRACT

Systems and methods for operating a driveline of a hybrid vehicle are disclosed. In one example, output of an electric machine is adjusted after commanding reactivation of all engine cylinder valves that have been deactivated. The electric machine torque may counteract the engine producing torque that is greater than a requested torque due to high intake manifold pressure.

6 Claims, 7 Drawing Sheets

METHODS AND SYSTEM FOR REACTIVATING ENGINE CYLINDERS

FIELD

The present description relates to methods and a system for operating a hybrid powertrain that includes an engine and an electric machine to propel a vehicle. The methods and systems may be particularly useful for hybrid vehicles that include cylinders that may be deactivated.

BACKGROUND AND SUMMARY

An engine may include intake and exhaust valves that may be selectively deactivated in a closed position to conserve fuel. The engine may continue to rotate while engine intake valves are deactivated and a vehicle is coasting so that engine torque may be made available quickly and without having to accelerate the engine crankshaft from rest. Even though the engine's throttle may be closed while the engine rotates with its intake valves held closed, pressure in the engine's intake manifold may rise to or near atmospheric pressure due to clearances that allow the throttle to open and close. The high intake manifold pressures may result in the engine producing more torque than is requested when engine cylinders are reactivated if the engine is operated with a nearly stoichiometric air-fuel ratio to reduce tailpipe emissions. This additional torque may cause a momentary torque disturbance in the vehicle's driveline that may be mitigated by fully opening or slipping a torque converter clutch to allow engine torque to be transmitted to the vehicle's transmission via a hydraulic torque path. However, increasing driveline slip may reduce driveline efficiency and at least some of the engine torque increase may be felt by vehicle occupants.

The inventors herein have recognized the above-mentioned issues and has developed an engine operating method, comprising: rotating an engine while holding all engine intake valves closed; adjusting torque of an electric machine according to a difference of a requested engine torque and an estimated engine torque in response to reactivating one or more of all engine intake valves being held closed.

By adjusting torque of an electric machine according to a difference of a requested engine torque and an estimated engine torque in response to reactivating one or more of all deactivated engine intake valves being held closed, it may be possible to provide the technical result of reducing a driveline torque disturbance so that slip of the driveline may not be increased to maintain or improve vehicle drivability. In one example, the electric machine may generate a negative torque to absorb the positive engine torque produced when deactivated engine cylinders are reactivated and intake manifold pressure is substantially atmospheric pressure (e.g., within 5% of atmospheric pressure) immediately before reactivation of engine cylinders begins. The negative torque that is produced via the electric machine may counteract the positive torque that is produced via the engine so that driveline noise and vibration levels may be maintained while torque converter slip is not increased. Consequently, the additional engine torque may be converted into useful electrical energy and driveline slip may not be increased.

The present description may provide several advantages. For example, the approach may improve driveline efficiency. Further, the approach may reduce noticeable driveline torque disturbances. Additionally, the approach allows engine poppet valves to be closed to reduce engine pumping work when driver demand torque is low so that the vehicle's coasting distance may be increased, thereby increasing vehicle fuel efficiency.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
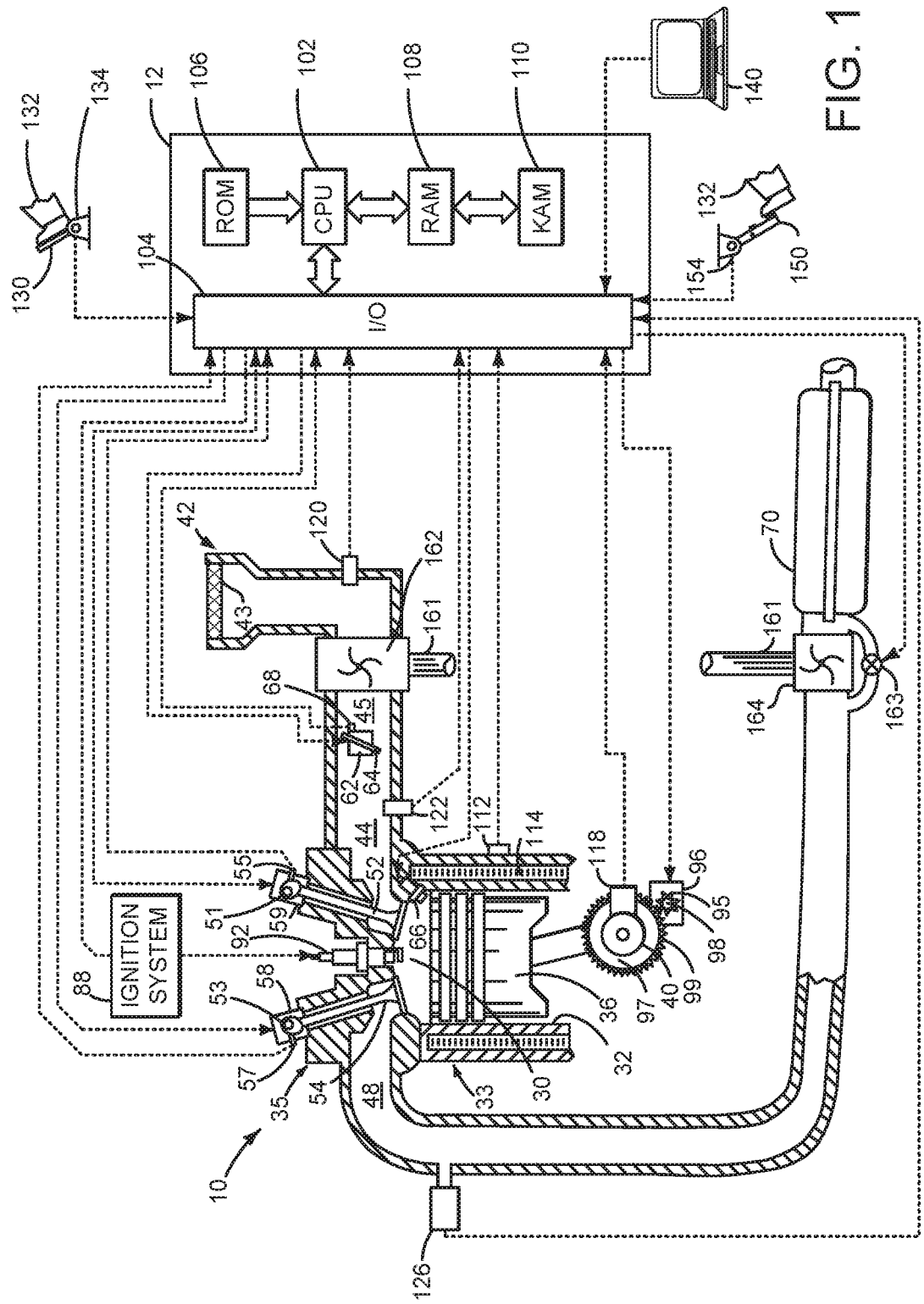
FIG. 1 is a schematic diagram of an engine.
Figure 2:
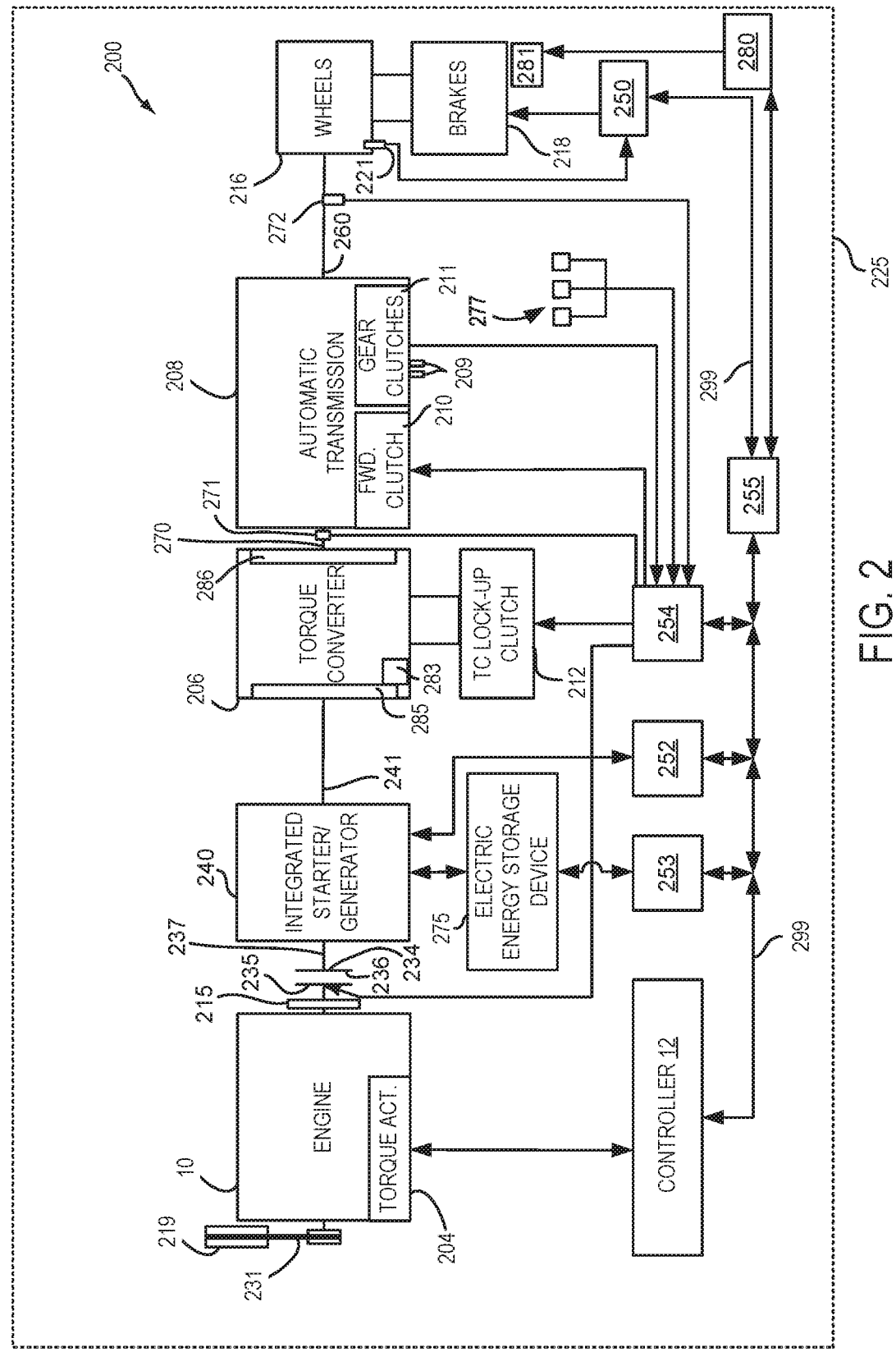
FIG. 2 is a schematic diagram of an example hybrid vehicle driveline.
Figure 3A:
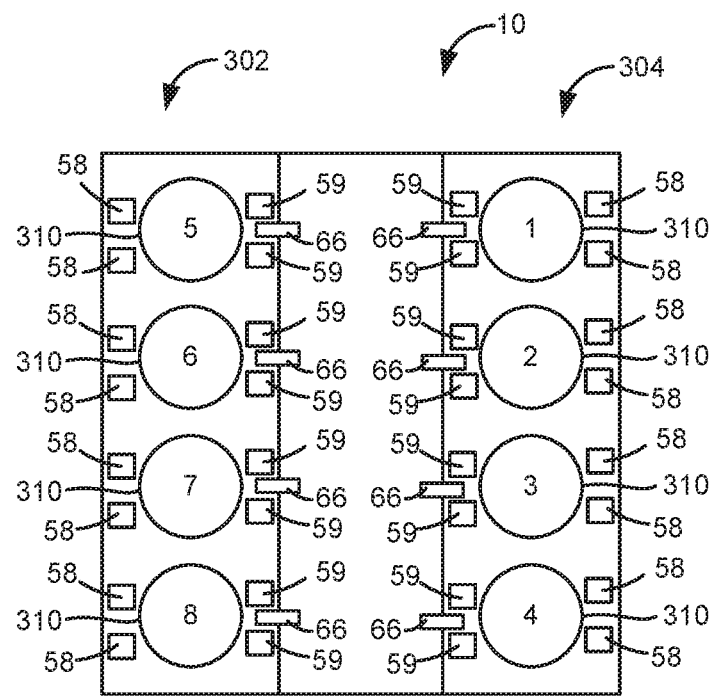
FIGS. 3A and 3B show example engines with deactivating valves that may be included in the hybrid vehicle driveline.
Figure 3B:
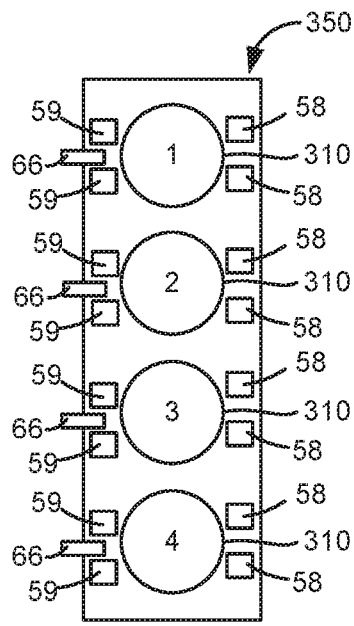

The present description is related to controlling driveline operation of a hybrid vehicle. The hybrid vehicle may include an internal combustion engine as shown in FIG. 1. The internal combustion engine may be included in a driveline or powertrain of a hybrid vehicle as shown in FIG. 2. The engine may also include deactivating cylinders and deactivating poppet valves as shown in FIGS. 3A and 3B. The hybrid driveline or powertrain may operate as shown in the operating sequence of FIG. 4. The hybrid vehicle may operate according to the methods of FIGS. 5-7.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-3B and employs the actuators shown in FIGS. 1-3B to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake camshaft 51 and an exhaust camshaft 53. The position of intake camshaft 51 may be determined by intake camshaft sensor 55. The position of exhaust camshaft 53 may be determined by exhaust camshaft sensor 57. Intake valves may be held closed over an entire engine cycle as the engine rotates via deactivating intake valve actuator 59, which may electrically, hydraulically, or mechanically operate intake valves. Alternatively, intake valves may be opened and closed during a cycle of the engine. Exhaust valves may be held closed over an entire engine cycle (e.g., two engine revolutions) as the engine rotates via deactivating exhaust valve actuator 58, which may be electrically, hydraulically, or mechanically operate exhaust valves. Alternatively, exhaust valves may be opened and closed during a cycle of the engine. Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive human driver input from human/machine interface device 140. Input device 140 may include a display panel and keyboard or virtual keyboard. A human may input requests for vehicle driving mode via input device 140.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. Engine 10 may be started with an engine starting system shown in FIG. 1, via belt driven integrated starter/generator (BISG) 219, or via driveline integrated starter/generator (ISG) 240 also known as a motor/generator. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG is mechanically coupled to engine 10 via belt 231. BISG may be coupled to crankshaft 40 or a camshaft (e.g., 51 or 53). BISG may operate as a motor when supplied with electrical power via electric energy storage device 275 (e.g., a battery). BISG may operate as a generator supplying electrical power to electric energy storage device 275.

An engine output torque may be transmitted to an input or first side of powertrain disconnect clutch 235 through flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 235. ISG 240 may provide a positive torque or a negative torque to powertrain 200 via operating as a motor or generator as instructed by electric machine controller 252.

Torque converter 206 includes a turbine 286 to output torque to input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed step ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210.

Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his/her foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his/her foot from a brake pedal, brake controller instructions, and/or vehicle system controller instructions and/or information. For example, vehicle brakes may apply a frictional force to wheels 216 via controller 250 as part of an automated engine stopping procedure.

Vehicle system controller 255 may also communicate vehicle suspension settings to suspension controller 280. The suspension of vehicle 225 may be adjusted to critically damp, over damp, or under damp the vehicle suspension via variable dampeners 281.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG 240 or BISG 219. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206, which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and/or engine 10, and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Engine 10 may also provide a negative torque by ceasing fuel delivery to engine cylinders. Engine cylinders may be deactivated with intake and exhaust valves opening and closing during engine rotation or with intake and exhaust valves held closed over one or more engine cycles while the engine rotates. Any portion of desired negative wheel torque that may not be provided by engine 10 and/or ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Referring now to FIG. 3A, an example multi-cylinder engine 10 showing deactivating intake and exhaust valve actuators is shown. The engine includes cylinders and associated components as shown in FIG. 1. Engine 10 includes eight cylinders 310. Each of the eight cylinders is numbered and the numbers of the cylinders are included within the cylinders. Fuel injectors 66 selectively supply fuel to each of the cylinders that are activated (e.g., combusting fuel during a cycle of the engine). Cylinders 1-8 may be selectively deactivated to improve engine fuel economy when less than the engine's full torque capacity is requested. Further, intake and exhaust valves of selected cylinders may be deactivated to change engine pumping characteristics. For example, cylinders 2, 3, 5, and 8 (e.g., a fixed pattern of deactivated cylinders) may be deactivated during an engine cycle (e.g., two revolutions for a four stroke engine) and may be deactivated for a plurality of engine cycles while engine speed and load are constant or very slightly. During a different engine cycle, a second fixed pattern of cylinders 1, 4, 6, and 7 may be deactivated. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. During some conditions all cylinders may be deactivated via holding all intake and exhaust valves of all cylinders closed over one or more engine cycles (e.g., two revolutions for a four stroke engine).

Engine 10 may also include deactivating valve actuators 58 and 59. The deactivating valve actuators make it possible to control whether air is inducted into each individual cylinder on a cycle by cycle basis. During some engine cycles when air is inducted into a cylinder, fuel may be added to the air and a spark introduced to produce power on that event. The burned gasses can then be exhausted into the adjacent exhaust manifold. On other engine cycles when air is inducted, fuel may not be added and no combustion takes place. The fresh air can then be exhausted into the adjacent exhaust manifold. On other cycles, the intake and exhaust valves may be deactivated so that no air is inducted or exhausted.

Each cylinder includes variable intake valve operators 59 and variable exhaust valve operators 58. An engine cylinder may be deactivated by its variable intake valve operators 59 and variable exhaust valve operators holding intake and exhaust valves of the cylinder closed during an entire cycle of the cylinder. An engine cylinder may be activated by its variable intake valve operators 59 and variable exhaust valve operators 58 opening and closing intake and exhaust valves of the cylinder during a cycle of the cylinder. Engine 10 includes a first cylinder bank 304, which includes four cylinders 1, 2, 3, and 4. Engine 10 also includes a second cylinder bank 302, which includes four cylinders 5, 6, 7, and 8. Cylinders of each bank may be active or deactivated during a cycle of the engine.

Referring now to FIG. 3B, an example multi-cylinder engine 10 showing deactivating intake and exhaust valves actuators is shown. The engine includes cylinders and associated components as shown in FIG. 1. Engine 10 includes four cylinders 310. Each of the four cylinders is numbered and the numbers of the cylinders are included within the cylinders. Fuel injectors 66 selectively supply fuel to each of the cylinders that are activated (e.g., combusting fuel during a cycle of the engine with intake and exhaust valves opening and closing during a cycle of the cylinder that is active).

Engine 10 may also include deactivating valve actuators 58 and 59. The deactivating valve actuators make it possible to control whether air is inducted into each individual cylinder on a cycle by cycle basis. During some engine cycles when air is inducted into a cylinder, fuel may be added to the air and a spark introduced to produce power on that event. The burned gasses can then be exhausted into the adjacent exhaust manifold. On other engine cycles when air is inducted, fuel may not be added and no combustion takes place. The fresh air can then be exhausted into the adjacent exhaust manifold. On other cycles, the intake and exhaust valves may be deactivated so that no air is inducted or exhausted.

Cylinders 1-4 may be selectively deactivated (e.g., not combusting fuel during a cycle of the engine with intake and exhaust valves held closed over an entire cycle of the cylinder being deactivated) to improve engine fuel economy when less than the engine's full torque capacity is requested. For example, cylinders 2 and 3 (e.g., a fixed pattern of deactivated cylinders) may be deactivated during a plurality of engine cycles (e.g., two revolutions for a four stroke engine). During a different engine cycle, a second fixed pattern cylinders 1 and 4 may be deactivated over a plurality of engine cycles. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. In this way, the deactivated engine cylinders may rotate or change from one engine cycle to the next engine cycle.

Engine 10 includes a single cylinder bank 350, which includes four cylinders 1-4. Cylinders of the single bank may be active or deactivated during a cycle of the engine. Each cylinder includes variable intake valve operators 59 and variable exhaust valve operators 58. An engine cylinder may be deactivated by its variable intake valve operators 59 and variable exhaust valve operators 58 holding intake and exhaust valves of the cylinder closed during a cycle of the cylinder. An engine cylinder may be activated by its variable intake valve operators 59 and variable exhaust valve operators 58 opening and closing intake and exhaust valves of the cylinder during a cycle of the cylinder.

Thus, the systems of FIGS. 1-3B provides for a system, comprising: an engine; an electric machine coupled to the engine; and a vehicle system controller including executable instructions stored in non-transitory memory to adjust a torque of the electric machine according to a difference of a requested engine torque and an estimated engine torque in response to reactivating one or more of all engine intake valves. The system further comprises additional instructions to determine the estimated engine torque as a function of intake manifold pressure as intake manifold pressure is reduced from atmospheric pressure to a pressure at which the engine produces the requested engine torque. The system includes where the requested engine torque is based on accelerator pedal position. The system further comprises additional instructions to rotate the engine with all engine intake valves closed. The system further comprises additional instructions to activate all engine intake valves after all engine intake valves are closed in response to the requested engine torque increasing. The system includes where the estimated engine torque is greater than the requested engine torque.

Figure 4:
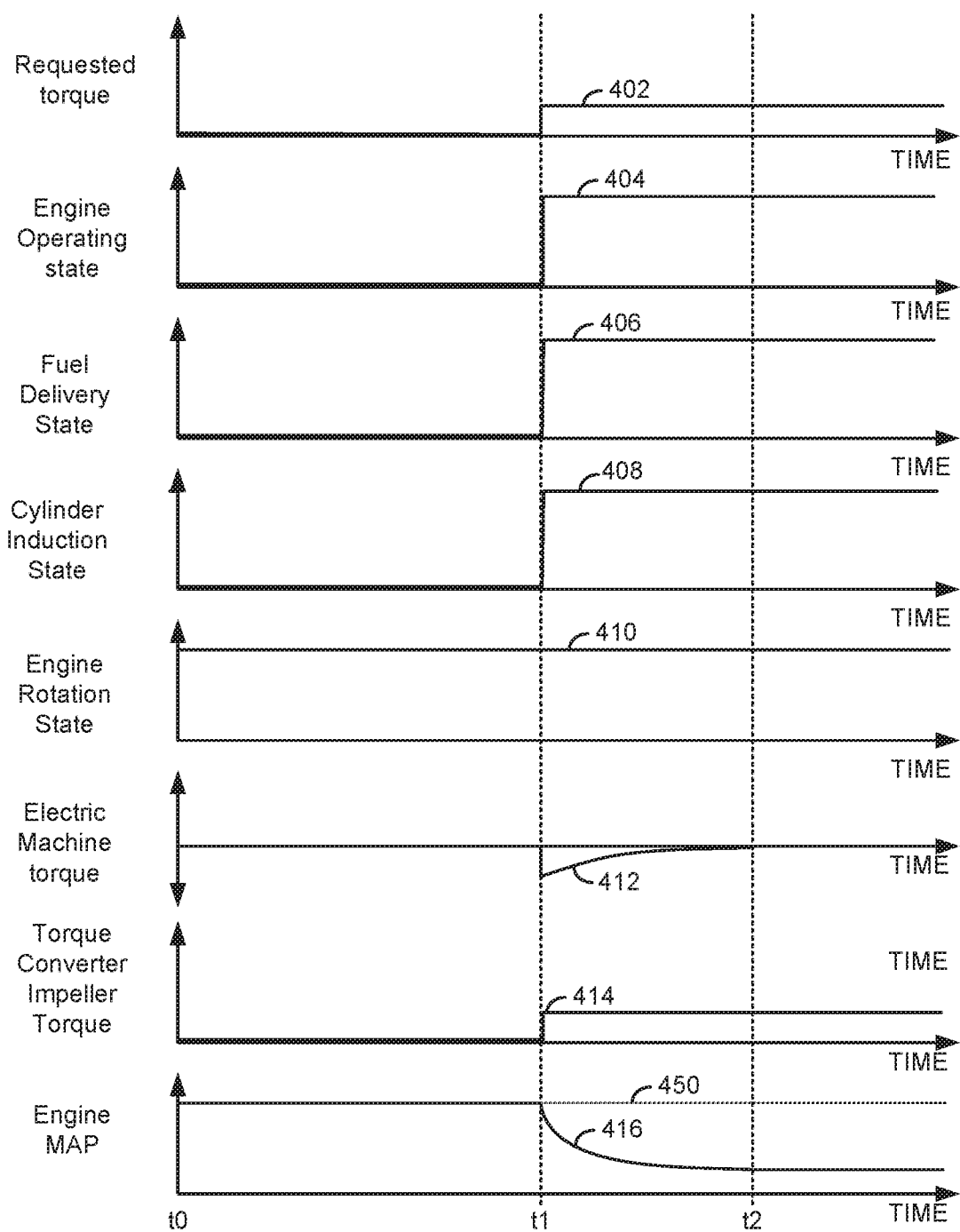
FIG. 4 shows an example hybrid vehicle operating sequence.

Referring now to FIG. 4, a prophetic hybrid driveline operating sequence is shown. The sequence of FIG. 4 may be provided according to the method of FIG. 5 along with or in conjunction with the system of FIGS. 1-3B. The plots shown in FIG. 4 occur at the same time and are aligned in time.

The first plot from the top of FIG. 4 is a plot of requested torque converter input torque (e.g., requested torque converter impeller torque), which may be provided as a combination of requested engine torque and requested electric machine torque (e.g., torque requested of electric machine 24 shown in FIG. 2), versus time. The vertical axis represents requested torque converter input torque and requested torque converter input torque increases in the direction of the vertical axis arrow. The requested torque converter input torque is zero at the vertical level that corresponds to the horizontal axis. The horizontal axis represents time and time increases from the left side of the figure to the right side of the figure. Horizontal line 402 represents requested torque converter input torque.

The second plot from the top of FIG. 4 is a plot of engine operating state versus time. The engine is operating (e.g., rotating and combusting fuel) when trace 404 is near the height of the vertical axis arrow. The engine is not combusting fuel when trace 404 is near the horizontal axis. Trace 404 represents the engine operating state.

The third plot from the top of FIG. 4 is a plot of engine fuel delivery state versus time. The vertical axis represents engine fuel delivery state and fuel is being delivered to the engine when the trace is at a higher level near the vertical axis arrow. Fuel is not being delivered to the engine when trace 406 is at a lower level near the horizontal axis. Trace 406 represents the engine fuel injection state.

The fourth plot from the top of FIG. 4 is a plot of engine air induction state (e.g., whether or not air is being inducted into engine cylinders) versus time. The vertical axis represents engine air induction state and air is being inducted to engine cylinders (e.g., intake and exhaust valves are opening and closing during an engine cycle) when trace 408 is at a higher level near the vertical axis arrow. Air is not being inducted to engine cylinders (e.g., intake and exhaust valves are being held closed during an engine cycle) when trace 408 is at a lower level near the horizontal axis. Trace 408 represents the engine air induction state.

The fifth plot from the top of FIG. 4 is a plot of engine rotation state versus time. The vertical axis represents engine rotation state and the engine is rotating when trace 410 is at a higher level near the vertical axis arrow. The engine is not rotating and is stopped when trace 410 is near the horizontal axis. The horizontal axis represents time and time increases from the left side of the figure to the right side of the figure. Trace 410 represents the engine rotation state.

The sixth plot from the top of FIG. 4 is a plot of electric machine torque versus time. The vertical axis represents electric machine torque and electric machine torque is positive (e.g., rotating the driveline) above the horizontal axis. Positive electric machine torque increases in the direction of the up direction vertical axis arrow. The magnitude of negative electric machine torque increases in the direction of the down direction vertical axis arrow. The horizontal axis represents time and time increases from the left side of the figure to the right side of the figure. Horizontal line 412 represents electric machine torque.

The seventh plot from the top of FIG. 4 is a plot of torque converter impeller torque versus time. The vertical axis represents torque converter impeller torque and torque converter impeller torque increases in the direction of the vertical axis arrow. The horizontal axis represents time and time increases from the left side of the figure to the right side of the figure. Horizontal line 414 represents torque converter impeller torque.

The eighth plot from the top of FIG. 4 is a plot of engine intake manifold absolute pressure (MAP) versus time. The vertical axis represents engine intake manifold absolute pressure and engine intake manifold absolute pressure increases in the direction of the vertical axis arrow. The horizontal axis represents time and time increases from the left side of the figure to the right side of the figure. Horizontal line 416 represents engine intake manifold absolute pressure. Horizontal line 450 represents atmospheric pressure.

At time t0, the engine is rotating via the vehicle's kinetic energy being transferred from vehicle wheels (not shown) to the engine. The engine is not combusting fuel and intake and exhaust valves are being held closed during engine cycles. Requested torque and electric machine torque are zero and the torque converter impeller torque is low. Engine MAP is at atmospheric pressure since air enters the engine and is not drawn into engine cylinders while the intake and exhaust valves are deactivated in a closed state.

At time t1, the driver (not shown) increases the requested torque while the engine continues to rotate. Shortly thereafter, fuel delivery to cylinders begins and intake and exhaust valves begin to open and close as the engine rotates. Thus, the engine is reactivated with all cylinders being reactivated in this example. The engine begins to generate an amount of torque that is greater than the requested torque because MAP is high and the engine is operated with a stoichiometric air-fuel ratio to reduce engine emissions. The electric machine begins to absorb torque from the driveline and generate electric charge, which is stored in an electric energy storage device (not shown). The torque converter impeller torque is equal to the requested torque since the electric machine consumes a portion of the additional engine torque that is produced via operating the engine at higher MAP.

Between time t1 and time t2, the requested torque remains constant and the engine continues to operate and generate torque. The amount of torque that is generated is reduced as MAP is reduced due to engine cylinders pumping down the engine intake manifold. The negative torque produced by the electric machine is reduced so that engine torque plus electric machine torque equals the requested torque. Fuel is delivered to the engine and air is inducted into the engine while the engine continues to rotate. The engine continues to operate with a stoichiometric air-fuel ratio.

At time t2, the amount of engine torque that is produced is equal to the requested torque. The electric machine torque has been reduced to zero and engine MAP has reached a level where the engine produces the requested amount of torque. The requested torque amount is unchanged and the engine continues to operate and rotate. Fuel is injected to the engine and air is injected into the engine so that the engine provides the requested torque. Torque converter impeller torque is equal to the requested torque. The engine continues to operate with a stoichiometric air-fuel ratio.

In this way, an engine may be reactivated when engine MAP is at or near atmospheric pressure such that driveline slip (e.g., slip of a torque converter clutch) may not have to be increased to maintain smooth torque transfer through the driveline. Further, higher levels of engine torque may be converted into useful electrical energy that may be used at a later time t0 conserve fuel.

Figure 5:
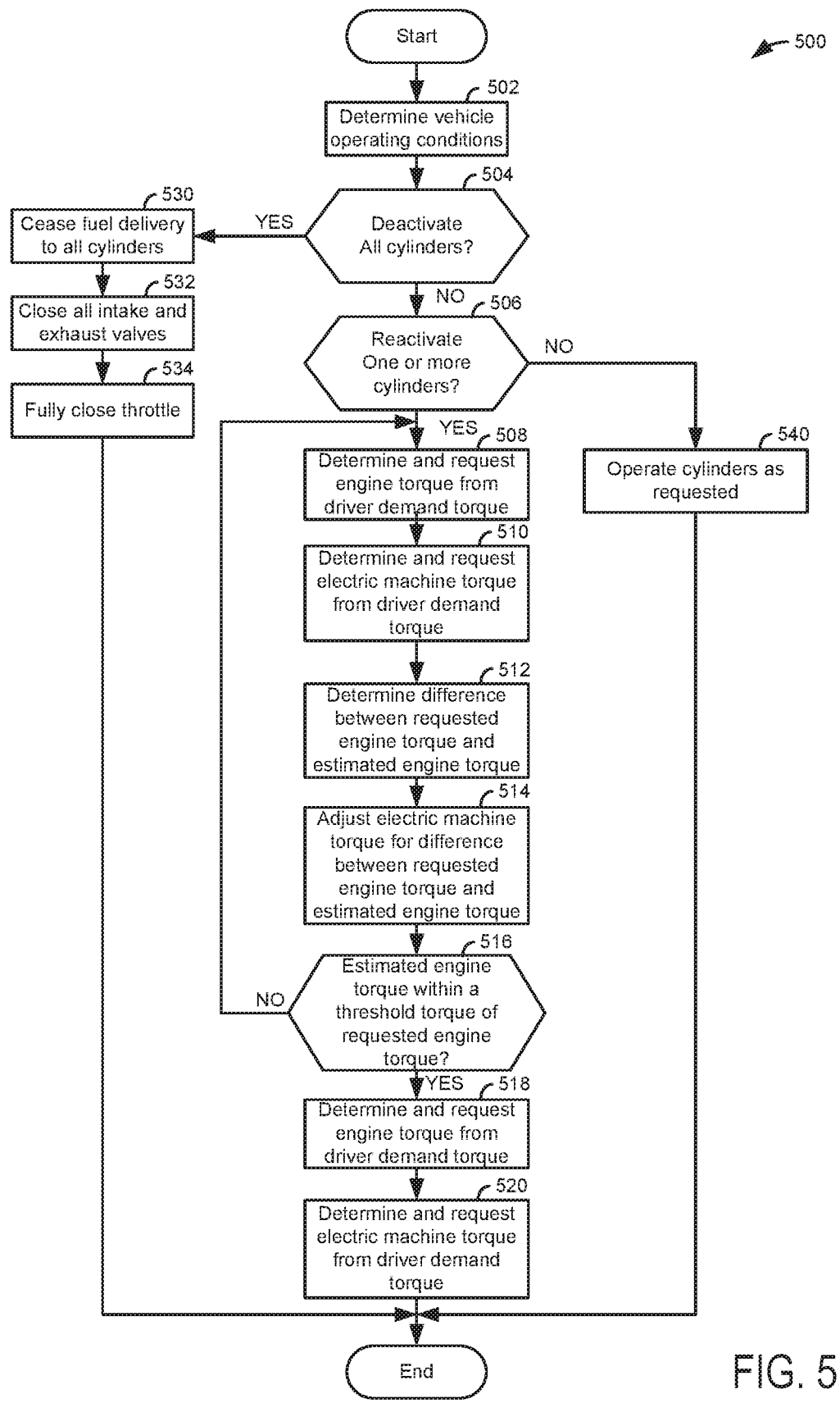
FIGS. 5-7 show example methods for operating a hybrid vehicle.

Referring now to FIG. 5, a method for operating a hybrid vehicle is disclosed. The method of FIG. 5 may be incorporated into the system of FIGS. 1-3B as executable instructions stored in non-transitory memory. Additionally, portions of the method of FIG. 5 may be actions performed via the controller 12 shown in FIGS. 1 and 2 to transform a state of a device or actuator in the real world. The engine operates with a stoichiometric air-fuel ratio when the engine is combusting fuel while the method of FIG. 5 is being performed. Further, the electric machine may be rotated via a vehicle's kinetic energy when all engine cylinders are deactivated.

At 502, method 500 determines vehicle operating conditions. Vehicle operating conditions may include, but are not limited to vehicle speed, engine speed, engine temperature, ambient air pressure, MAP, driver demand torque, and battery state of charge (SOC). In one example, driver demand torque may be a requested amount of torque to be delivered to an impeller of a torque converter as shown in FIG. 2. The driver demand torque may be determined from a table or function that holds empirically determined values of driver demand torque. The function or table may be referenced via accelerator pedal position and vehicle speed. Method 500 proceeds to 504.

At 504, method 500 judges if all engine cylinders are to be deactivated while allowing the engine to rotate via the vehicle's kinetic energy that may be delivered from the vehicle's wheels to the transmission and then to the engine. In one example, method 500 may deactivate all engine cylinders when requested torque is less than a threshold torque and vehicle speed is greater than a threshold speed. If method 500 judges that all engine cylinders are to be deactivated, the answer is yes and method 500 proceeds to 530. Otherwise, the answer is no and method 500 proceeds to 506.

At 530, method 500 ceases fuel delivery and spark to engine cylinders. Fuel delivery may be ceased via closing fuel injectors and holding the fuel injectors in a closed state as the engine continues to rotate. Method 500 proceeds to 532.

At 532, method 500 closes all intake and exhaust valves of all engine cylinders to cease induction of air into the cylinders. Thus, all poppet valves of all cylinders are deactivated. In some examples, only intake valves of all engine cylinders may be deactivated if exhaust valves of the engine may not be deactivated. Method 500 proceeds to 534.

At 534, method 500 fully closes the engine's throttle (e.g., 62 of FIG. 2). The engine throttle is fully closed so that MAP may be quickly reduced if a requested torque increases at a later time and intake manifold pressure needs to decrease for the engine to generate the requested amount of torque. Method 500 proceeds to exit.

At 506, method 500 judges whether or not to reactivate one or more cylinders, including reactivating all engine cylinders. In one example, method 500 may reactivate one or more cylinders in response to an increase in driver demand torque. In another example, method 500 may reactivate one or more engine cylinders in response to vehicle speed being less than a threshold speed. If method 500 judges to reactivate one or more cylinders after all the engine cylinders have been deactivated, the answer is yes and method 500 proceeds to 508. Otherwise, the answer is no and method 500 proceeds to 540.

At 540, method 500 continues to operate the engine in its present operating state. For example, if the engine is operating with all cylinders activated, all cylinders continue to operate. If all cylinders and poppet valves of the cylinders are deactivated, then all of the cylinders and poppet valves remain deactivated. If a fraction of engine cylinders are deactivated, the same fraction of cylinders remains deactivated. The engine's MAP may be substantially equal (e.g., within 5% of atmospheric pressure) to atmospheric pressure when the engine is rotating with all valves in a closed state. Method 500 proceeds to exit.

At 508, method 500 determines and requests an amount of torque from the engine. In one example, method 500 determines a requested engine torque as a percentage of driver demand torque, the presently engaged transmission gear, and vehicle speed and converter input torque. The percentage values may be empirically determined and stored in a table or function that is referenced by driver demand torque, engaged transmission gear, and vehicle speed. For example, if driver demand torque is 100 Newton-meters (Nm) and the percentage based on presently engaged transmission gear and vehicle speed is 90%, then the requested engine torque is 90 Nm. In other examples, an engine power may be requested or the requested engine torque may be determined in other known ways. Method 500 commands the engine to the requested engine torque. Method 500 proceeds to 510.

At 510, method 500 determines the requested amount of electric machine torque. In one example, method 500 determines the amount of electric machine torque via subtracting the percentage of torque provided via the engine from 100% and multiplying the requested torque by the result. For example, 100%(1)-90% (0.9)*100 Nm=10 Nm. Of course, electric machine torque may be determined in other known ways. Method 500 proceeds to 512.

At 512, method 500 determines a difference between the requested engine torque and the estimated torque produced by the engine (e.g., the estimated engine torque). In one example, an estimated engine torque may be modeled as a function of present values of engine speed, MAP, spark timing, cam timing, and engine air-fuel ratio. Thus, in one example, a table or function may be referenced via engine speed, MAP, spark timing, cam timing, and engine air-fuel ratio. Alternatively, a function or table may be referenced via present values of engine speed and MAP, the table or function outputs a torque value and the torque value is modified via spark timing, cam timing, and engine air-fuel ratio. The table or model outputs the estimated engine torque. Method 500 then subtracts the estimated engine torque from the requested engine torque that was determined at 508 to determine an engine torque error. Method 500 proceeds to 514.

At 514, method 500 adjusts the electric machine torque by adding the engine torque error torque amount to the requested electric machine torque that was determined at 510 to determine an adjusted electric machine torque. Method 500 commands the electric machine to the adjusted electric machine torque. Method 500 proceeds to 516.

At 516, method 500 judges if the estimated engine torque is within a threshold torque (e.g., 5 Nm) of the requested engine torque once all engine cylinders are combusting fuel. If so, the answer is yes and method 500 proceeds to 518. Otherwise, the answer is no and method 500 returns to 508. Alternatively, method 500 may judge if actual MAP is within a threshold MAP of a MAP that produces the requested engine torque at the present engine speed.

At 518, method 500 determines and requests an amount of torque from the engine as described at 508. Method 500 commands the engine to the requested engine torque. Method 500 proceeds to 520.

At 520, method 500 determines the requested amount of electric machine torque as described at 510. Method 500 commands the electric machine to the requested electric machine torque. Method 500 proceeds to exit.

In this way, engine torque may be compensated at a time when an engine transitions from rotating with no active cylinders and all poppet valves deactivated to rotating with one or more cylinders being activated and poppet valves of the one or more cylinders being activated. The electric machine provides a compensation torque that is determined from engine MAP. Thus, as engine MAP decays from atmospheric pressure to a MAP value where the engine generates the requested torque, electric machine compensation decays with MAP.

Figure 6:
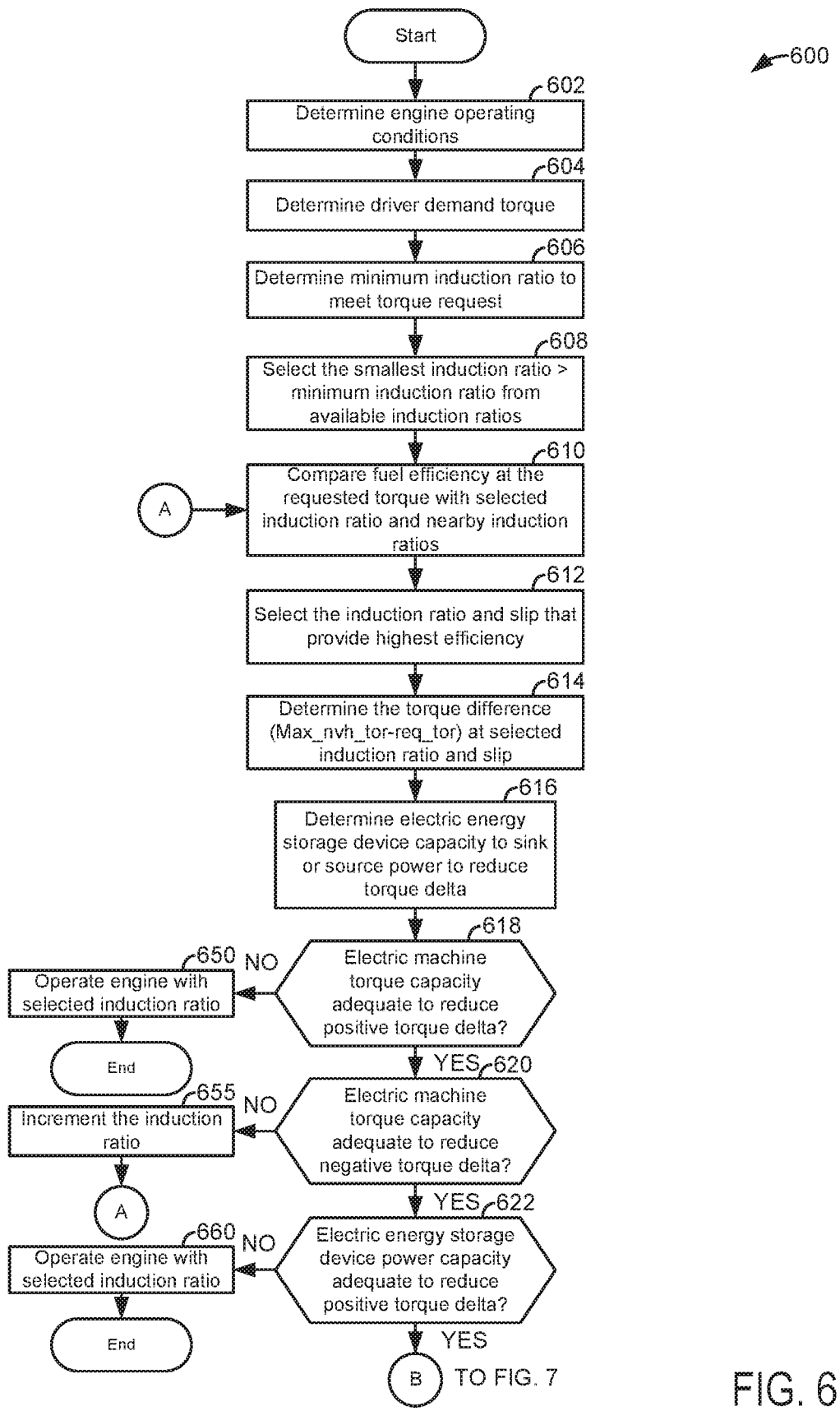
Figure 7:
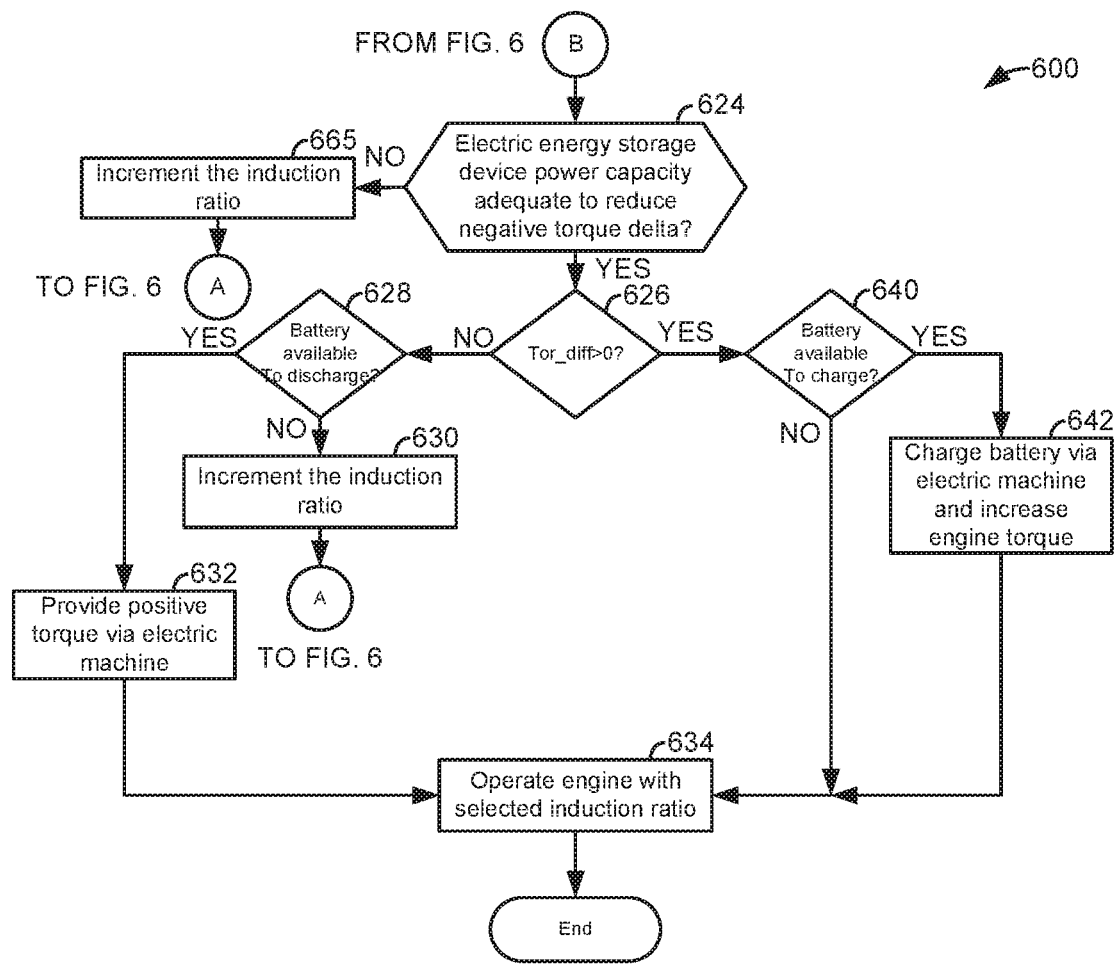

Referring now to FIGS. 6 and 7, a method for operating a hybrid vehicle is disclosed. The method of FIGS. 6 and 7 may be incorporated into the system of FIGS. 1-3B as executable instructions stored in non-transitory memory. Additionally, portions of the method of FIGS. 6 and 7 may be actions performed via the controller 12 shown in FIGS. 1 and 2 to transform a state of a device or actuator in the real world.

At 602, method 600 determines engine operating conditions. Engine operating conditions may include but are not limited to vehicle speed, ambient temperature, engine temperature, electric energy storage device state of charge (SOC), and electric energy storage device temperature. Method 600 proceeds to 604.

At 604, method 600 determines driver demand torque. In one example, driver demand torque may be a requested amount of torque to be delivered to an impeller of a torque converter as shown in FIG. 2, but driver demand torque may be a wheel torque or a torque at another location in the driveline. The driver demand torque may be determined from a table or function that holds empirically determined values of driver demand torque. The function or table may be referenced via accelerator pedal position and vehicle speed. Method 600 proceeds to 606.

At 606, method 600 determines a minimum induction ratio to meet the requested torque or the driver demand torque. In one example, method 600 references a table that holds engine induction ratios (e.g., an actual total number of active cylinders divided by an actual total number of engine cylinders) that is referenced or indexed via the present engine speed and the requested or driver demand torque. The table outputs engine induction ratios that have capacity to provide the requested torque. For example, if driver demand is 300 Nm at 2500 RPM, then the table or function may output induction ratios of 1 (e.g., all eight cylinders active), 5/8, 6/8, and 7/8 when the driver demand torque may be met by five or more active cylinders at 2500 RPM. Method 600 proceeds to 608 after the induction ratios are determined.

At 608, method 600 selects a smallest induction ratio of the induction ratios determined at 606. Method 600 proceeds to 610.

At 610, method 600 compares fuel efficiency of the selected induction ratio with induction ratios that are the next higher and next lower induction ratios from the selected induction ratio and that may still provide the desired amount of torque. For example, if the selected induction ratio is 5/8 and the next higher induction ratio is 11/16, then method 600 compares the fuel efficiency of operating the engine with the 5/8 induction ratio and operating the engine with an induction ratio of 11/16. Further, method 600 may compare the fuel efficiency of operating the engine with the 5/8 induction ratio and operating the engine with an induction ratio of 9/16. The induction ratios are compared at levels of driveline slip for each induction ratio is a minimum for acceptable driveline noise and vibration. For example, if minimum slip for achieving a desired vibration noise level is 40 RPM slip when the engine is operated with a 5/8 induction ratio, then the fuel efficiency of operating the engine with a 5/8 induction ratio and 40 RPM slip is the basis for comparing to other induction ratios. Method 600 proceeds to 612.

At 612, method 600 selects the induction ratio that provides the highest engine fuel efficiency from the induction ratios that were compared at 610. Method 600 proceeds to 614.

At 614, method 600 determines a torque difference between the requested torque and the greatest torque that the selected induction ratio may provide at its minimum slip for acceptable driveline vibration. The torque difference may be determined via the following equation:

$$Tor\_diff = Max\_nvh\_tor - req\_tor$$

where $Tor\_diff$ is the torque difference between the requested torque and the maximum torque that may be generated by operating the engine with the selected induction ratio, $Max\_nvh\_tor$ is the maximum (e.g., upper threshold) torque that may be provided by the engine operating with the selected induction ratio and driveline slip, and $req\_tor$ is the amount of torque that has been requested at 604. Method 600 proceeds to 616.

At 616, method 600 determines the capacity of the electric energy storage device to sink or source electric power that is sufficient to reduce the torque difference determined at 614. For example, method 600 determines the amount of power that the electric energy storage device may sink and the amount of power that the electric energy storage device may source. In one example, method 600 counts coulombs that are presently stored in the electric energy storage device and then indexes a table or function of empirically determined power values via the present number of coulombs stored in the electric energy storage device. In some examples, the table or function may also be referenced or indexed via an estimate of the internal resistance of the electric energy storage device. The table or function outputs an amount of power that the electric energy storage device may source if the torque difference determined at 614 is a negative value. The table or function outputs an amount of power that the electric energy storage device may sink if the torque difference determined at 614 is a positive value. Method 600 proceeds to 618.

At 618, method 600 judges if the torque capacity of the electric machine is adequate to reduce a positive torque difference determined at 614. In one example, method 600 references a table of empirically determined negative torque capacities (e.g., resistance to torque input to the electric machine when the electric machine is operating as a generator) for the electric machine via a speed of the electric machine. The table outputs a value and if the value indicates that the electric machine has capacity that is adequate to reduce the positive torque capacity to zero (e.g., extract torque from the driveline and store charge in the electric energy storage device), then the answer is yes and method 600 proceeds to 620. Otherwise, the answer is no and method 600 proceeds to 650.

At 650, method 600 operates the engine with the selected induction ratio. In particular, the engine rotates and combusts fuel in cylinders that are activated to provide the selected induction ratio. Method 600 proceeds to exit.

At 620, method 600 judges if the torque capacity of the electric machine is adequate to reduce a negative torque difference determined at 614. In one example, method 600 references a table of empirically determined negative torque capacities (e.g., resistance to torque input to the electric machine when the electric machine is operating as a generator) for the electric machine via a speed of the electric machine. The table outputs a value and if the value indicates that the electric machine has capacity that is adequate to reduce the negative torque capacity to zero (e.g., add torque to the driveline), then the answer is yes and method 600 proceeds to 622. Otherwise, the answer is no and method 600 proceeds to 655.

At 655, method 600 increments the selected induction ratio (e.g., increases the induction ratio to the next induction ratio) and returns to 610. The engine's torque capacity may increase when the engine is operated with the incremented induction ratio.

At 622, method 600 judges if the electric energy storage device has power storage capacity to reduce a positive torque difference determined at 614. In one example, method 600 determines an amount of power that is output by the electric machine when the electric machine is providing a negative torque to counteract the positive torque produced by the engine to generate the torque difference determined at 614 at the present speed of the electric machine. Method 600 may references a table of empirically determined power output values for the electric machine via a speed of the electric machine. The table outputs a value and if the value indicates that the electric energy storage device has capacity that is adequate to reduce the positive torque capacity to zero, then the answer is yes and method 600 proceeds to 624. Otherwise, the answer is no and method 600 proceeds to 660.

At 660, method 600 operates the engine with the selected induction ratio. In particular, the engine rotates and combusts fuel in cylinders that are activated to provide the selected induction ratio. Method 600 proceeds to exit.

At 624, method 600 judges if the electric energy storage device has power storage capacity to reduce a negative torque difference determined at 614. In one example, method 600 determines an amount of power that is consumed by the electric machine when the electric machine is providing a positive torque to augment the torque produced by the engine to reduce the torque difference determined at 614 at the present speed of the electric machine. Method 600 may references a table of empirically determined power consumption values for the electric machine via a speed of the electric machine. The table outputs a value and if the value indicates that the electric energy storage device has capacity that is adequate to reduce the negative torque capacity to zero, then the answer is yes and method 600 proceeds to 626. Otherwise, the answer is no and method 600 proceeds to 665.

At 665, method 600 increments the selected induction ratio (e.g., increases the induction ratio to the next induction ratio) and returns to 610. The engine's torque capacity may increase when the engine is operated with the incremented induction ratio.

At 626, method 600 judges if the torque difference determined at 614 is greater than zero. If so, the answer is yes and method 600 proceeds to 640. Otherwise, the answer is no and method 600 proceeds to 628.

At 640, method 600 judges if the electric energy storage device is available to receive charge. If so, the answer is yes and method 600 proceeds to 642. Otherwise, the answer is no and method 600 proceeds to 634. Method 600 may judge that the electric energy storage device is available to receive charge when a temperature of the electric energy storage device is within a desired range and SOC of the electric energy storage device is less than a threshold.

At 642, method 600 charges the electric energy storage device and increases engine output so that engine torque is equal to Max_nvh_tor. The engine torque may be increased via one or more of opening the engine throttle, increasing fuel flow to the engine, and advancing spark timing. Method 600 proceeds to 634.

At 634, method 600 operates the engine with the selected induction ratio. In particular, the engine rotates and combusts fuel in cylinders that are activated to provide the selected induction ratio. Method 600 proceeds to exit.

At 628, method 600 judges if the electric energy storage device is available to discharge. If so, the answer is yes and method 600 proceeds to 632. Otherwise, the answer is no and method 600 proceeds to 630. Method 600 may judge that the electric energy storage device is available to discharge when a temperature of the electric energy storage device is within a desired range and SOC of the electric energy storage device is greater than a threshold.

At 632, method 600 discharges the electric energy storage device and increases electric machine output torque so that the requested torque is met by the engine and the electric machine. Method 600 proceeds to 634.

At 630, method 600 increments the selected induction ratio (e.g., increases the induction ratio to the next induction ratio) and returns to 610. The engine's torque capacity may increase when the engine is operated with the incremented induction ratio.

In this way, an electric machine may be used in cooperation with an internal combustion engine to improve driveline efficiency. If the engine has additional torque capacity while operating with an efficient induction ratio to provide a requested torque, then the engine torque output may be increased to increase SOC of an electric energy storage device. If the engine lacks torque capacity to meet a requested torque while operating with an efficient induction ratio, then electric machine output may be increased to meet the requested torque.

The methods of FIGS. 5-7 provide for an engine operating method, comprising: rotating an engine while holding all engine intake valves closed; adjusting torque of an electric machine according to a difference of a requested engine torque and an estimated engine torque in response to reactivating one or more of all engine intake valves being held closed. The method includes where the estimated engine torque is a function of intake manifold pressure as intake manifold pressure decays from atmospheric pressure to a pressure at which the engine produces the requested engine torque. The method includes where the engine is rotated via inertia of a vehicle in which the engine resides. The method includes where an engine throttle is fully closed while rotating the engine while holding all engine intake valves closed. The method further comprises holding all exhaust engine valves closed while rotating the engine. The method includes where adjusting torque of the electric machine includes generating a negative torque via the electric machine. The method further comprises rotating the engine without flowing fuel to the engine while holding all engine intake valves closed. The method further comprises rotating the engine while engine intake manifold pressure is substantially equal to atmospheric pressure.

The method of FIGS. 5-7 also provide for an engine operating method, comprising: selecting an engine induction ratio from a plurality of available engine induction ratios; and increasing engine torque output and charge generated via an electric machine such that an engine operates at an upper threshold torque that may not be exceeded by the engine in response to an electric energy storage device being available for charging and the upper threshold torque of the selected induction ratio minus a driver demand torque being greater than zero; and increasing electric machine positive torque output such that electric machine torque plus engine torque meets driver demand torque in response to the electric energy storage device being available for discharging and the upper threshold torque of the selected induction ratio minus a driver demand torque being less than zero. The method further comprises selecting a different engine induction ratio in response to the electric energy storage device not being available for discharging when the upper threshold torque of the selected induction ratio minus the driver demand torque is less than zero. The method includes where the engine induction ratio is selected based on fuel efficiency of an engine. The method includes where engine torque output is increased via opening a throttle. The method further comprises charging the electric energy storage device when the upper threshold torque of the selected induction ratio minus a driver demand torque is greater than zero. The method further comprises discharging the electric energy storage device when the upper threshold torque of the selected induction ratio minus a driver demand torque is less than zero.

In another representation, the method of FIGS. 5-7 provides for adjusting an induction ratio of an engine in response to a torque capacity of an electric machine being less than a difference between a threshold engine torque and a requested engine torque. The method further comprises adjusting the induction ratio in response to a battery having insufficient capacity to reduce the difference via providing charge to the electric machine. The method further comprises charging the battery in response to the difference being greater than zero. The method further comprises discharging the battery in response to the difference being less than zero.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
   selecting an engine induction ratio from a plurality of available engine induction ratios; and thereafter:
   increasing engine torque output and charge generated via an electric machine such that an engine operates at an upper threshold torque that may not be exceeded by the engine in response to an electric energy storage device being available for charging and the upper threshold torque of the selected induction ratio minus a driver demand torque being greater than zero; and
   increasing electric machine positive torque output such that electric machine torque plus engine torque meets driver demand torque in response to the electric energy storage device being available for discharging and the upper threshold torque of the selected induction ratio minus the driver demand torque being less than zero,
   wherein the upper threshold torque is a maximum torque that may be provided by the engine operating with selected engine induction ratio.

2. The method of claim 1, further comprising selecting a different engine induction ratio in response to the electric energy storage device not being available for discharging when the upper threshold torque of the selected induction ratio minus the driver demand torque is less than zero.

3. The method of claim 1, where the engine induction ratio is selected based on fuel efficiency of an engine.

4. The method of claim 1, where engine torque output is increased via opening a throttle.

5. The method of claim 1, further comprising charging the electric energy storage device when the upper threshold torque of the selected induction ratio minus the driver demand torque is greater than zero.

6. The method of claim 1, further comprising discharging the electric energy storage device when the upper threshold torque of the selected induction ratio minus the driver demand torque is less than zero.

* * * * *